United States Patent
Papiernik

(10) Patent No.: US 7,319,910 B2
(45) Date of Patent: Jan. 15, 2008

(54) METHOD AND DEVICE FOR CONTROLLING A MOVEMENT OF A MOVABLE MACHINE ELEMENT OF A MACHINE TOOL OR PRODUCTION MACHINE

(75) Inventor: Wolfgang Papiernik, Neunkirchen (DE)

(73) Assignee: Siemens Aktiengesellschaft, München (DE)

( * ) Notice: Subject to any disclaimer, the term of this patent is extended or adjusted under 35 U.S.C. 154(b) by 128 days.

(21) Appl. No.: 11/016,693

(22) Filed: Dec. 17, 2004

(65) Prior Publication Data

US 2005/0143847 A1 Jun. 30, 2005

(30) Foreign Application Priority Data

Dec. 19, 2003 (DE) ................. 103 59 984

(51) Int. Cl.
*F16F 15/20* (2006.01)
(52) U.S. Cl. .................. 700/63; 700/61; 700/186; 318/600; 318/632; 318/561
(58) Field of Classification Search .............. 700/61, 700/186, 63; 318/600, 632, 561
See application file for complete search history.

(56) References Cited

U.S. PATENT DOCUMENTS

| | | | | |
|---|---|---|---|---|
| 3,699,563 A | * | 10/1972 | Cass | ................. 246/168.1 |
| 4,031,509 A | * | 6/1977 | Matulevich | ................. 340/441 |
| 4,219,767 A | * | 8/1980 | Wimmer | ................. 318/696 |
| 4,287,461 A | * | 9/1981 | Promis et al. | ................. 318/571 |
| 4,651,070 A | * | 3/1987 | Truman et al. | ................. 388/811 |
| 4,906,908 A | * | 3/1990 | Papiernik et al. | ................. 318/600 |
| 5,062,064 A | * | 10/1991 | Sagues et al. | ................. 702/147 |
| 5,465,035 A | * | 11/1995 | Scaramuzzo et al. | ................. 318/561 |
| 5,638,267 A | | 6/1997 | Singhose et al. | |

(Continued)

FOREIGN PATENT DOCUMENTS

DE 101 33 612 A1 2/2003
EP 0 309 824 B1 11/1991

OTHER PUBLICATIONS

Sinjhose, W. et al.: Effects of Input Shaping on Two-Dimensional Trajectory Following. In: IEEE Transactions on Robotics and Automation, vol. 12, issue 6, Dec. 1996, pp. 881-887, ISSN: 1042-296X.*

(Continued)

*Primary Examiner*—Anthony Knight
*Assistant Examiner*—Tejal Gami
(74) *Attorney, Agent, or Firm*—Henry M. Feiereisen; Ursula B. Day

(57) ABSTRACT

A method and device for controlling a movement of a movable machine element of a machine tool or production machine with at least two drive axles are disclosed. At least one mechanical characteristic frequency is determined for each drive axle of the machine, and the lowest mechanical characteristic frequency is selected from the determined mechanical characteristic frequencies. For each drive axle of the machine, desired values are supplied to a control unit associated with the drive axle, whereby the desired values of the drive axles having a mechanical characteristic frequency higher than the lowest mechanical characteristic frequency are time-delayed. The disclosed method and device modify a method referred to as "Input Shaping" so that geometrically linked drive axles can be operated simultaneously.

13 Claims, 10 Drawing Sheets

U.S. PATENT DOCUMENTS

| | | | | |
|---|---|---|---|---|
| 5,854,544 | A * | 12/1998 | Speth et al. | 318/270 |
| 6,023,988 | A * | 2/2000 | McKee et al. | 74/336 R |
| 6,567,711 | B1 * | 5/2003 | Hosek et al. | 700/55 |
| 6,981,423 | B1 * | 1/2006 | Discenzo | 73/800 |
| 6,982,536 | B2 * | 1/2006 | Geissdorfer et al. | 318/632 |
| 2003/0018400 | A1 * | 1/2003 | Tuttle et al. | 700/29 |

OTHER PUBLICATIONS

Singh, T. et al.: "Tutorial on Input Shaping/Time Delay Control of Maneuvering Flexible Structures", Proceedings of the American Control Conference, Anchorage, AK May 8-10, 2002, pp. 1717-1731.*

Proceedings of the Japan—USA Symposium on "Flexible Automation—1996—", vol. 1, Jul. 7-10, 1996, The American Society of Mechanical Engineers, United Engineering Center/345 East 47$^{th}$ Street / New York, N.Y. 10017, pp. 307-313.

Singhose, W. et al.: Effects of Input Shaping on Two-Dimensional Trajectory Following. In: IEEE Transactions on Robotics and Automation, vol. 12, issue 6, Dec. 1996, pp. 881-887, ISSN: 1042-296X.

Singer N C et al.: "Experimental Verification of Command Shaping Methods for Controlling Residual Vibration in Flexible Robots", Proceedings of the American Control Conference. San Diego, May 23-25, 1990, New York, IEEE, US, vol. 2, Conf. 9, May 23, 1990, pp. 1738-1744, XP000170010.

* cited by examiner

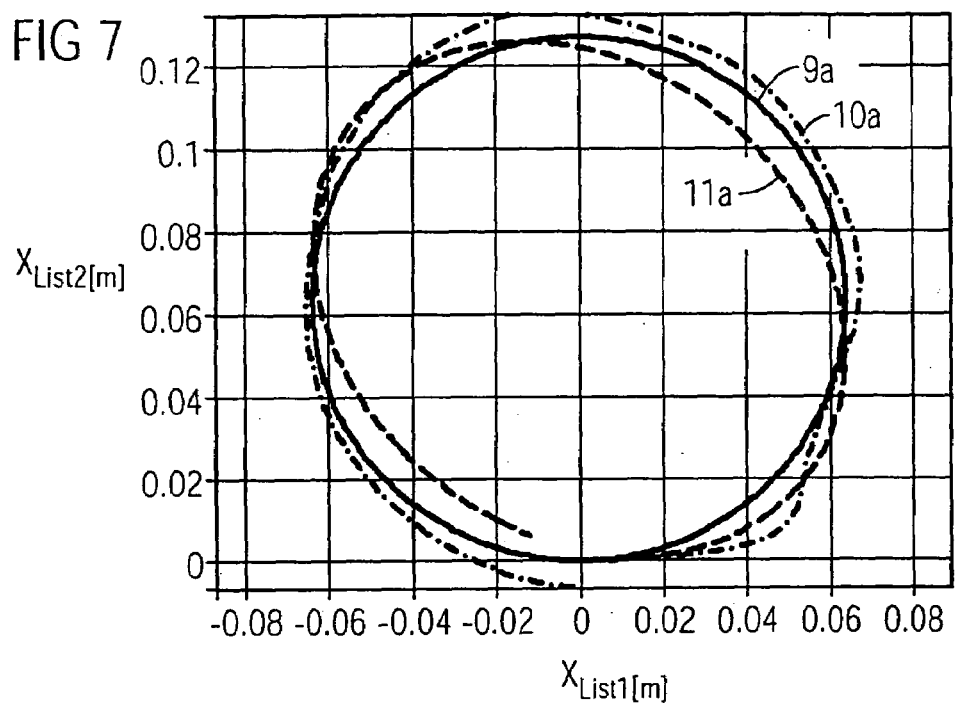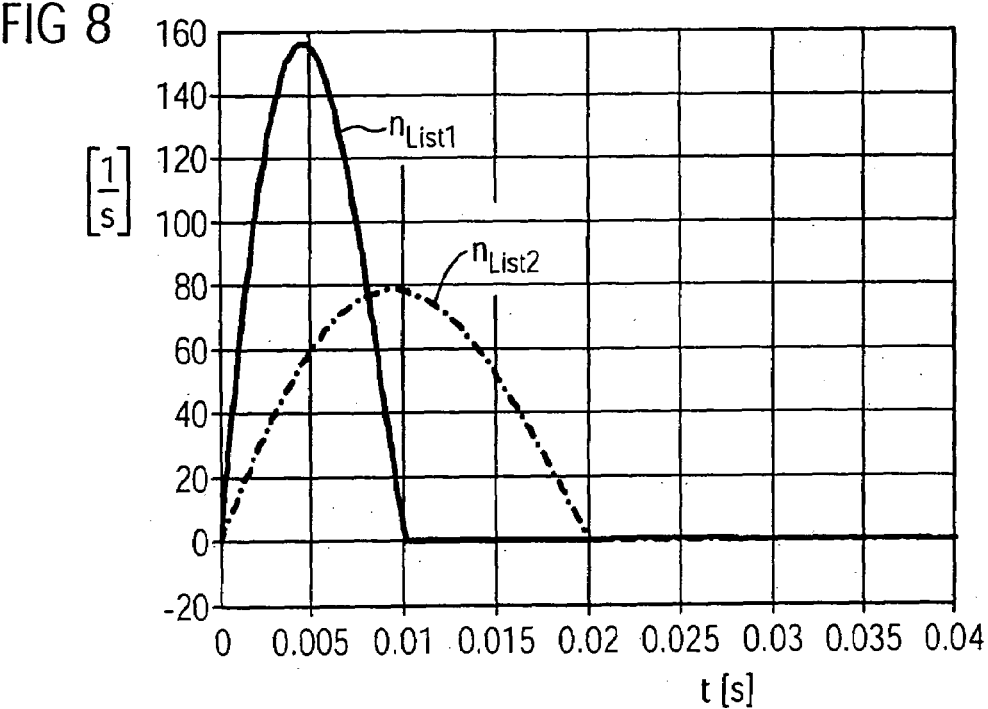

METHOD AND DEVICE FOR CONTROLLING A MOVEMENT OF A MOVABLE MACHINE ELEMENT OF A MACHINE TOOL OR PRODUCTION MACHINE

CROSS-REFERENCES TO RELATED APPLICATIONS

This application claims the priority of German Patent Application, Serial No. 103 59 984.3, filed Dec. 19, 2003, pursuant to 35 U.S.C. 119(a)-(d).

BACKGROUND OF THE INVENTION

The present invention relates to a method and a device for controlling a movement of a movable machine element of a machine tool or production machine with at least two drive axles.

Nothing in the following discussion of the state of the art is to be construed as an admission of prior art.

A mechanical system capable of oscillations (for example, a drive axle of a machine tool or production machine) is typically characterized by at least one characteristic frequency that can be excited during a movement and can adversely affect the actual position value of, for example, a machine element. Excitations the mechanical system of the machine should therefore be prevented.

FIG. 1 shows in form of a block diagram a prior art electric drive system of a machine tool or production machine, which is depicted as a two-axle machine and includes a controller 1 controlling the two drive axles 6a and 6b of the machine. The drive axle 6a includes a converter 3a, a drive motor 4a and a mechanical system 5a connected with the drive motor 4a. The drive axle 6b includes a converter 3b, a drive motor 4b and a mechanical system 5b connected with the drive motor 4b. Each drive axle has a separate control unit 2a and 2b, respectively, with the controller 1 supplying to each of the control units 2a and 2b a separate desired velocity curve in the form of a corresponding desired load rotation speed $n_{Lsoll1}$ and $n_{Lsoll2}$, which represent a desired movement path of a machine element driven by the drive axles 6a and 6b. Each of the control units 2a and 2b regulates via the associated converter 3a, 3b the corresponding actual load rotation speed $n_{List1}$ and $n_{List2}$ according to the desired parameters set by the controller, thereby moving the machine element along the predetermined path by way of the mechanical system 5a, 5b connected to the corresponding drive motor 4a, 4b. The term actual load rotation speed $n_{List1}$ and $n_{List2}$ is to be understood as a rotation speed of a spindle driven via a gear, whereby, for example, during each revolution of the spindle a machine element, such as a tool, is moved along an axle of the machine by a predetermined distance so as to change the position of the machine element. The machine element is then moved on the movement path along the two axes of the machine according to the actual position values $X_{List1}$ and $X_{List2}$. The feedback of the actual regulated valuables required for closed-loop control is not essential for an understanding of the invention and therefore omitted from FIG. 1 for sake of clarity.

FIG. 15 shows an exemplary movement path S for the two-axle machine of FIG. 1, wherein a machine element 8 implemented as a milling cutter is guided on the movement path S. The drive axle 6a in FIG. 1 is effects the movement in the $X_1$ direction, whereas the drive axle 6b effects the movement in the $X_2$ direction.

The excitation of oscillations, in particular of the mechanical components of the drive axles, can be suppressed by employing a so-called jerk-limiter. In this way, the load carried by the individual drive axles of the machine can be reduced, without adversely affecting the program processing time. A jerk-limiter can be used to control the acceleration buildup of a moving machine element, thereby smoothing the desired value so that the mechanical components move with a minimum of oscillations. The term jerk is to be understood as the time-derivative of the acceleration.

In conventional machines, the jerk and the acceleration values are adapted in the controller according to the defined machine data. Because the jerk and the acceleration values are controlled along the movement path S of the machine element, there exist only a limited number of options for preventing excitation of oscillations, in particular excitation at the respective characteristic frequency of geometrically linked drive axles.

The present invention has its foundation in the method known as "Input Shaping", which surmises that an oscillation excitation in a drive axle in response to an input impulse can be compensated by a delayed input impulse with a different amplitude. The mechanical components 5a or 5b of the drive axles 6a and 6b can be implemented by way of a so-called second-order proportional delay unit (hereinafter abbreviated as "PT2-unit"), which can be described, for example, for the drive axle 6a by the differential equation $$\frac{d^2 n_{List1}}{dt^2} = \omega_0^2 \cdot n_{Lsoll1} - \omega_0^2 \cdot n_{List1} - 2 \cdot D \cdot \omega_0 \cdot \frac{dn_{List1}}{dt} \text{ with} \quad (1)$$

$$\omega_0 = 2\pi \cdot f_0.$$

In an ideal situation, the transmission characteristics of the controller 2a and of the converter 3a can be neglected. The following terminology is used in equation (1):

D: damping factor of the mechanical components
$\omega_0$: characteristic angular velocity of the undamped mechanical components
t: time
$f_0$=characteristic frequency of the undamped mechanical components.

The impulse response of the PT2-unit can then be derived based on the equation (1) as follows:

$$n_{List1} = \frac{\omega_0}{\sqrt{1-D^2}} \cdot e^{-D\omega_0 t} \cdot \sin(\omega_d \cdot t) \text{ with} \quad (2)$$

$$\omega_d = 2\pi \cdot f_d = \omega_0 \cdot \sqrt{1+D^2} \quad (3)$$

$$T_d = \frac{1}{f_d} \quad (4)$$

wherein
$f_d$: characteristic frequency of the damped mechanical system
$T_d$: oscillation period length of the damped mechanical system.

FIG. 2 shows an exemplary curve of the time-dependence of the actual load rotation speed $n_{List1}$ (impulse response) of the drive axle 6a according to FIG. 1 after excitation with an impulse for a damping factor of D<1. The conventional method of "Input Shaping" is used to suppress oscillations in the actual load rotation speed $n_{List1}$ by exciting the PT2-unit with a second impulse which is applied with a time delay of half a period length of the oscillation period $T_d$. The amplitude of the second impulse is selected so that the maximum of the second impulse response produced by this impulse is identical to the minimum of the first impulse response.

FIG. 3 shows the impulse response $n_{List1}$ and the delayed impulse response $n_{List1v}$.

FIG. 4 shows the summed impulse response of the PT2-unit from both impulses in the form of a summed actual load rotation speed $n_{List1s}$. The mechanical system with the PT2-unit has an ideal transient response as a result of the addition of the two impulse responses $n_{List1}$ and $n_{List1v}$.

The position $X_{List1}$ of the machine element along the movement path illustrated in FIG. 5 is obtained by integrating the summed actual load rotation speed $n_{List1s}$. The position $X_{List1}$ is normalized in FIG. 1 to a value of "1". As shown in FIG. 5, the machine element can be controlled in the afore-described manner so as to attain a predetermined desired position without exciting oscillations. The two amplitudes A1 and A2 of the two excitation impulses can be computed as follows from the requirement that the impulse responses cancel out and the steady-state amplification is "1":

$$\frac{A_1}{A_2} = e^{\frac{\pi D}{\sqrt{1-D^2}}} \text{ and} \tag{5}$$

$$A_1 + A_2 = 1. \tag{6}$$

In a practical application of "Input Shaping," the curve of the desired load rotation speed $n_{Lsoll1}$ of the drive axle 6a is composed of a series of time-discrete impulses having constant amplitudes during the sampling time $T_s$. Because the system is linear, the relationships governing cancellation and steady-state amplification can be superimposed independently for all impulses.

This situation is illustrated in the example depicted in FIG. 6 for a step-like change in the desired load rotation speed $n_{Lsoll1}$ to a value of "1". In order to change, for example, the actual load rotation speed $n_{List1}$ to a normalized value of "1", an infinite number of impulses (indicated by 3 dots in FIG. 6), i.e., an infinite number (sampled values) of the desired load rotation speed $n_{Lsoll1}$ of length $T_s$ and amplitude $A_1$ are required, as well as an infinite number of impulses with an amplitude $A_2$ that are delayed by the delayed time $T_{ver1}$ (also indicated by 3 dots in FIG. 6). Only five values are shown FIG. 6 for sake of clarity. The desired load rotation speed $n_{Lsoll1}$ is obtained by summing all impulses, as shown in FIG. 6 by a wider solid line. The delay time $T_{ver1}$ is defined by the equation (7):

$$T_{ver1} = \frac{T_d}{2}. \tag{7}$$

When the afore-described method of "Input Shaping" is applied to machine tools or production machines with geometrically linked drive axles that have different mechanical characteristic frequencies, which is practically always the case, then the problem illustrated in FIG. 7 arises.

The movement path S illustrated in FIG. 7 is circular, with $X_{List1}$ and $X_{List2}$ representing the corresponding actual position values of the associated drive axles 6a and 6b. Curve 9a shows an ideal circular path, whereas curve 10a shows a somewhat distorted "circular" path when the machine is operated without "Input Shaping" and inaccuracies are introduced by mechanical oscillations of the drive axles 6a and 6b. When the machine is operated with "Input Shaping", the curve 11a assumes an elliptical shape instead of the ideal circular shape. Although mechanical oscillations are no longer excited with "Input Shaping," the result is not noticeably improved over a conventional operation without "Input Shaping."

The underlying cause for this problem was unclear to this date, and the method of "Input Shaping" was therefore applied only to movements along a single machine axle, when only one axle is driven at a time during operation. "Input Shaping" and other related methods have not been applied to movements along a circular path or in two-dimensional or three-dimensional space, where the individual drive axles are geometrically linked and are operated simultaneously.

It would therefore be desirable and advantageous to provide an improved method and device for controlling the movement of a movable machine element of a machine tool or production machine with at least two drive axles, which obviates prior art shortcomings and is able to specifically operate multiple geometrically linked drive axles of these machines.

SUMMARY OF THE INVENTION

According to one aspect of the present invention, a method for controlling a movement of a movable machine element of a machine tool or production machine with at least two drive axles includes the steps of determining for each drive axle of the machine at least one mechanical characteristic frequency, selecting from the determined mechanical characteristic frequencies a lowest mechanical characteristic frequency, supplying for each drive axle of the machine desired values to a control unit associated with that drive axle, and time-delaying the desired values of the drive axles having a mechanical characteristic frequency higher than the lowest mechanical characteristic frequency.

According to another aspect of the invention, a device for controlling a movement of a movable machine element of a machine tool or production machine with at least two drive axles includes a control unit associated with each drive axle in one-to-one correspondence for controlling the movement of the corresponding drive axle, a machine controller that generates for each drive axle of the machine corresponding desired values and supplies the generated desired values to the corresponding control unit associated with each drive axle as desired controlled variable, and a time delay unit that time-delays the desired values of those drive axles that have a mechanical characteristic frequency higher than a lowest mechanical characteristic frequency of the drive axles.

Machine tools in the context of the present invention can also include, for example, uniaxial or multi-axis lathes, milling machines, as well as drilling or grinding machines. Machine tools can further include processing centers, linear and rotary transfer machines, laser machines, rolling machines and/or gear cutters. These machines have in common that the material is machined along several axes. Production machines in the context of the present invention can include textile, paper, plastic, wood, glass, ceramic or stone processing machines, as well as machines used for forming, packaging, printing, conveying, lifting, pumping, transporting. Furthermore, fans, blowers, wind turbines, lifting gear, cranes, robots, production and assembly lines are also included under the term production machines in the context of the present invention.

According to an advantageous feature of the invention, the time-delayed desired values of the drive axles can be delayed by a delay time $$T_v = \text{abs} \frac{1}{2} * \left( \frac{1}{2f_{dv}} - \frac{1}{2f_d} \right),$$

wherein $f_{dv}$ is the mechanical characteristic frequency of a drive axle v with a mechanical characteristic frequency higher than the lowest mechanical characteristic frequency and $f_d$ is the mechanical characteristic frequency of the drive axle with the lowest mechanical characteristic frequency. This approach can significantly reduce distortions in the contour resulting from "Input Shaping".

According to another advantageous feature of the invention, the desired values can represent desired velocity values, desired position values, desired acceleration values and/or desired jerk values. The method and device of the invention can be used for these and other types of desired values.

According to yet another advantageous feature of the invention, the delay unit can be an integral component of the controller or of a closed-loop controller. The delay units can easily be integrated in an already existing controller and/or in existing closed-loop controllers or in the control units without requiring additional hardware, in particular when the machine tool or production machine already includes a numerical controller.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 7 shows ideal movement paths during conventional operation and with "Input shaping";

FIG. 8 shows a curve of the actual load rotation speed values after a jump in the desired values;

DETAILED DESCRIPTION OF PREFERRED EMBODIMENTS

Figure 1:
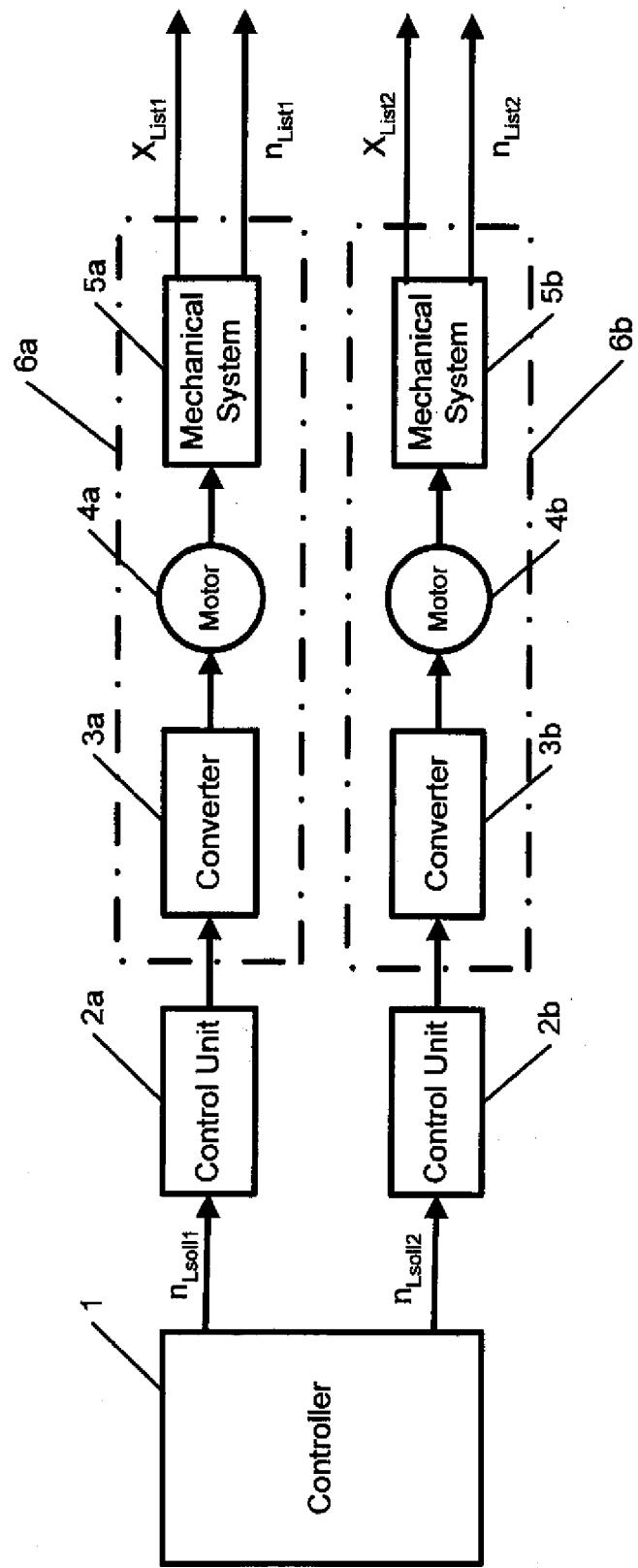
FIG. 1 is a block diagram of a two-axle machine tool or production machine.
Figure 2:
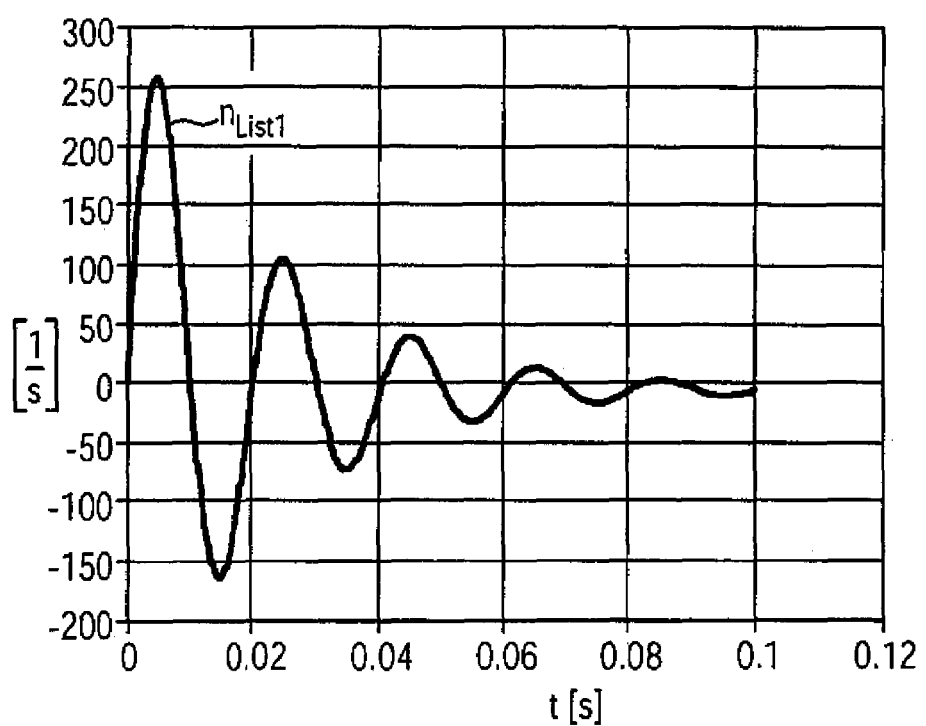
FIG. 2 shows an impulse response of a PT2-unit with a damping factor <1.
Figure 3:
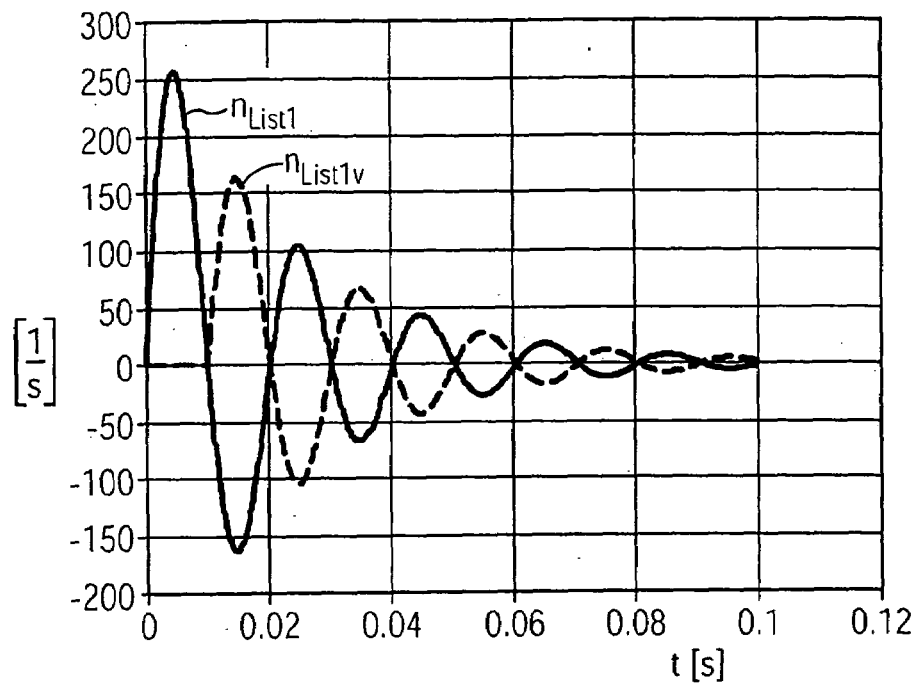
FIG. 3 shows impulse responses of a PT2-unit to two input impulses having a time offset.
Figure 4:
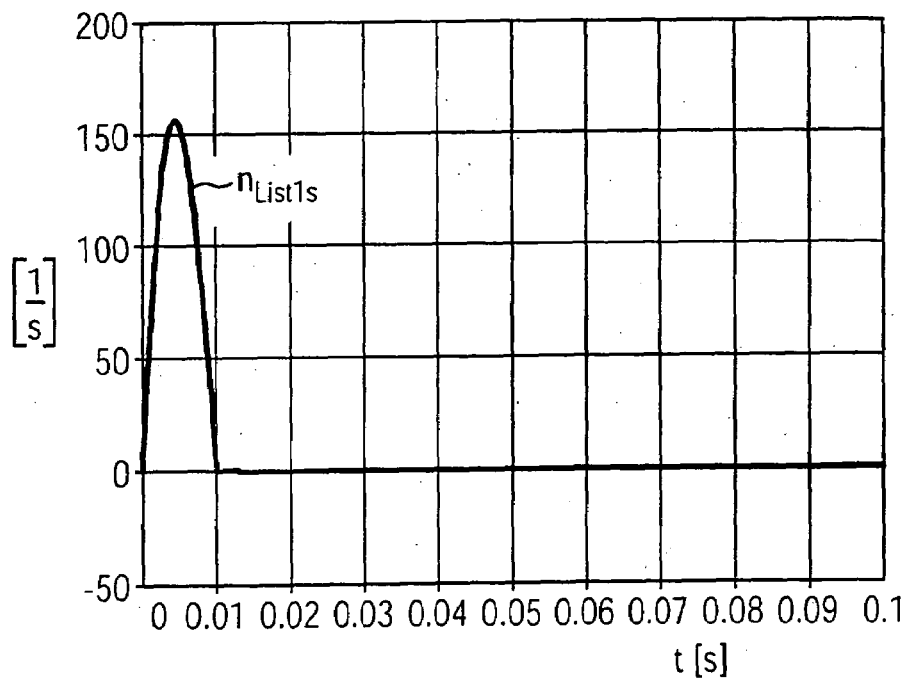
FIG. 4 shows the summed impulse response of a PT2-unit to two input impulses with the time offset of FIG. 3.
Figure 5:
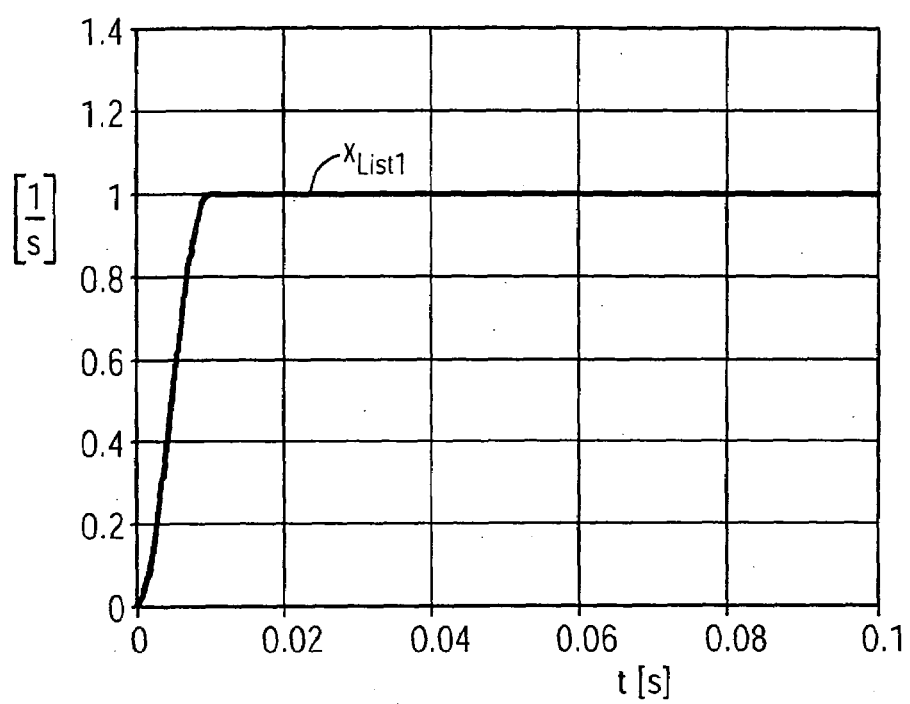
FIG. 5 shows a normalized curve of the position of a machine element.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

As mentioned above, the method of "Input Shaping" has not been applied to machines with drive axles that are geometrically linked and have different characteristic oscillation frequencies, because the results are unsatisfactory, as indicated in FIG. 7. The inventor has investigated the underlying causes for these unsatisfactory results, which were not known to date.

For the following discussion, it will be assumed that the method known as "Input Shaping" is already implemented in the controller 1 of FIG. 1, so that the two desired load rotation speed values $n_{Lsoll1}$ and $n_{Lsoll2}$ and FIG. 1 have each already been evaluated using "Input Shaping."

Turning now to FIG. 8, there are shown curves of two actual load rotation speed values $n_{List1}$ and $n_{List2}$ for the two drive axles 6a and 6b depicted in FIG. 1. It is evident that the actual load rotation speed value $n_{List1}$ of the drive axle 6a and the actual load rotation speed value $n_{List2}$ of the drive axle 6b do not exhibit transient oscillations, because the controller 1 applies "Input Shaping" to the outputted desired values.

Figure 9:
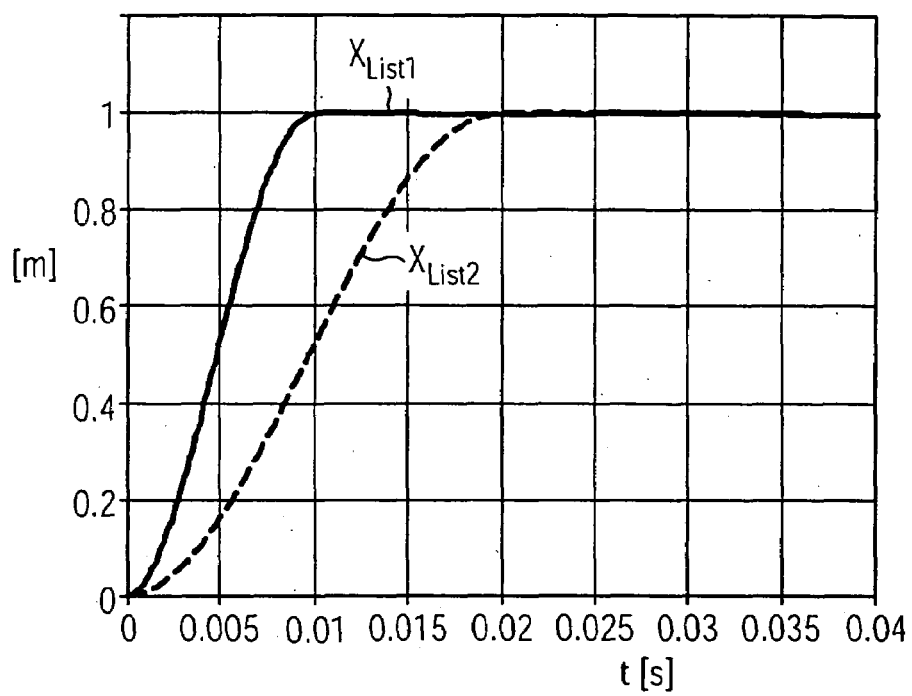
FIG. 9 shows a curve of the actual position values after a jump in the desired values.

FIG. 9 shows the corresponding position values $X_{List1}$ and $X_{List2}$ obtained by integrating the respective actual load rotation speed values $n_{List1}$ and $n_{List2}$. As seen in FIG. 9, the position values $X_{List1}$ and $X_{List2}$ have different delays, which distort the contour of the circles of FIG. 7.

Figure 6:
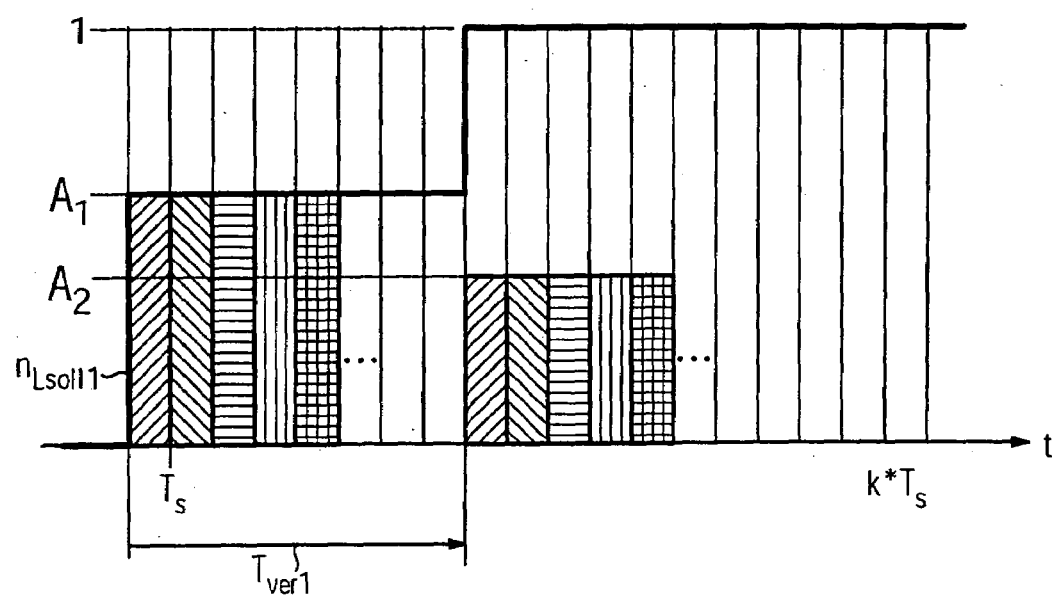
FIG. 6 shows time-discrete impulses of desired position values.

According to the present invention, the desired rotation speed values are provided by the controller 1, with "Input Shaping" applied in the controller 1, to each drive axle in the form of two time-delayed input impulse sequences, with FIG. 6 showing an exemplary input impulse sequence for the drive axle 6a. The desired rotation speed values are symmetrized so as to minimize the contour errors of the movement path S caused by "Input Shaping." According to the invention, the desired values of the drive axles v having a mechanical characteristic frequency $f_{dv}$ that is not the lowest mechanical characteristic frequency are time-delayed. The index v is an index of a drive axle and runs from 1 to (n−1), whereby n is the number of drive axles of the machine.

Figure 10:
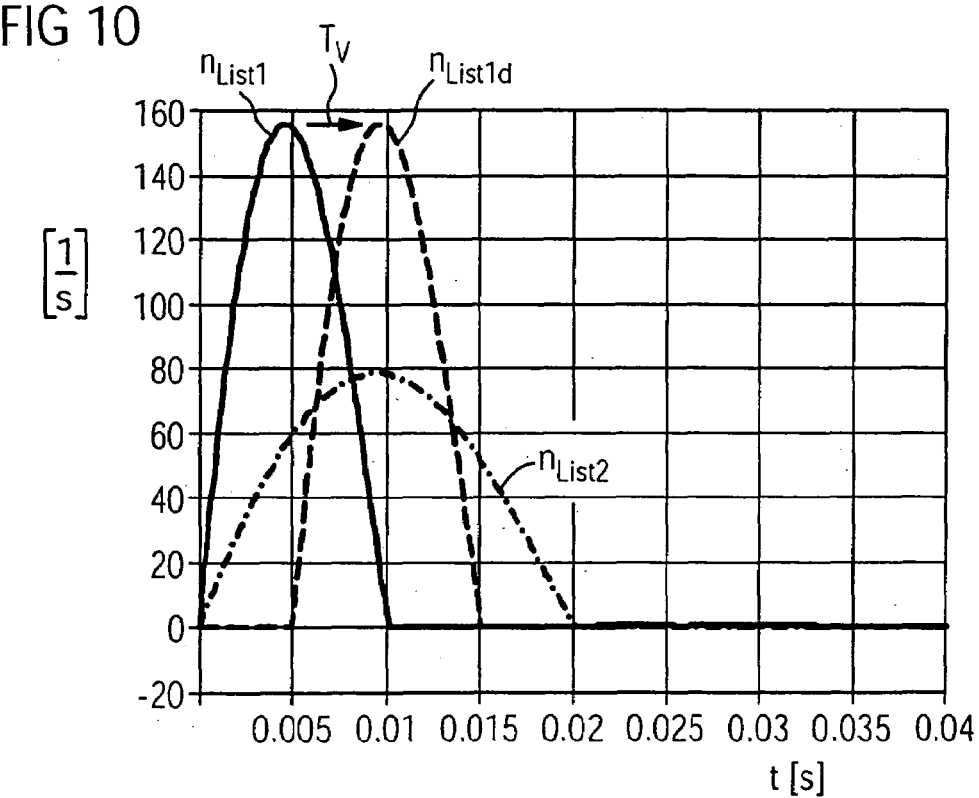
FIG. 10 shows a time delay of the actual load rotation speed values according to the invention.

The required delay time $T_v$ is illustrated in FIG. 10, which shows again the two actual load rotation speeds $n_{List1}$ and $n_{List2}$ from FIG. 8. According to the invention, the actual load rotation speed $n_{List1}$, which in the embodiment represents the drive axle with a mechanical characteristic frequency $f_{d1}$ that is not the lowest characteristic frequency, is time-delayed by a correction value corresponding to the actual load rotation speed of the drive axle with the lowest mechanical characteristic frequency, which in the illustrated embodiment is the drive axle 6b. In the illustrated embodiment, the drive axle 6a (v=1) has a characteristic frequency of 50 Hz, whereas the drive axle 6b (v=2) has a characteristic frequency of 25 Hz. The time-delayed actual load rotation speed $n_{List1}$ with the time delay $T_v$ is labeled in FIG. 10 with $n_{List1d}$. It should be noted that the amplitude of the time-delayed actual load rotation speed $n_{List1d}$ and of the actual load rotation speed $n_{List1}$ of the second drive axle, i.e., the drive axle with the lowest mechanical characteristic frequency $f_d$, must be identical over time.

Figure 11:
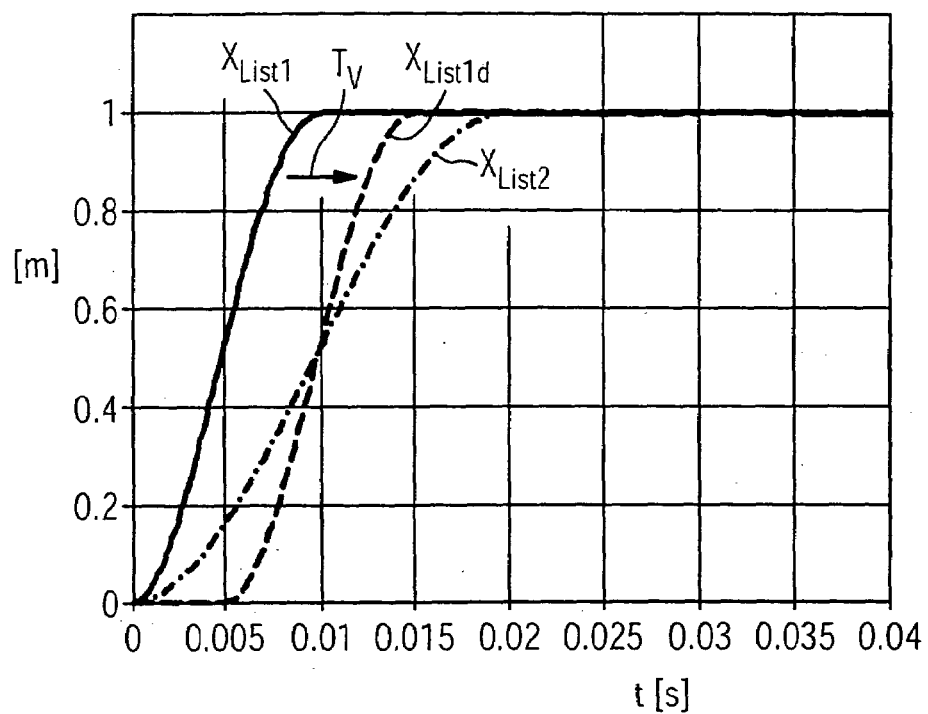
FIG. 11 shows curves of actual position values obtained with the method of the invention.

The corresponding position values $X_{List1}$, $X_{List2}$, and $X_{List1d}$ shown in FIG. 11 are obtained by integrating the actual load rotation speeds $n_{List1}$, $n_{List2}$, and $n_{List1d}$. It is evident that with the delay according to the invention, the integrated position values are identical for the two drive axles 6a and 6b, thereby minimizing contour errors.

In order to ensure that the time delay of the actual load rotation values of the drive axle with the lowest mechanical characteristic frequency is always used, the desired values, i.e., the desired load rotation values $n_{Lsoll1}$ of the drive axle with a mechanical characteristic frequency that is not the lowest characteristic frequency are time-delayed. In the depicted embodiment, the drive axle 6a has a characteristic frequency that is not the lowest mechanical characteristic frequency. Particularly advantageous results are obtained, when the desired values of the drive axles v with a mechanical frequency $f_{dv}$ that is not the lowest mechanical characteristic frequency have an identical or at least, similar delay time of $$T_v = \text{abs}\frac{1}{2} * \left(\frac{1}{2f_{dv}} - \frac{1}{2f_d}\right) \quad (8)$$

$$v = 1 \text{ to } (n-1)$$

n: number of drive axles
abs(u): absolute value of the function u.

$f_{dv}$ represents here the mechanical characteristic frequency of a drive axle v that does not have the lowest mechanical characteristic frequency, whereas $f_d$ represents the drive axle with lowest mechanical characteristic frequency. In the illustrated embodiment, the drive axle 6a has a mechanical characteristic frequency $f_{d1}$ that is not the lowest mechanical characteristic frequency, so that the desired load rotation speed $n_{Lsoll1}$ of the drive axle 6a is time-delayed with the delay time $T_v$.

Figure 12:
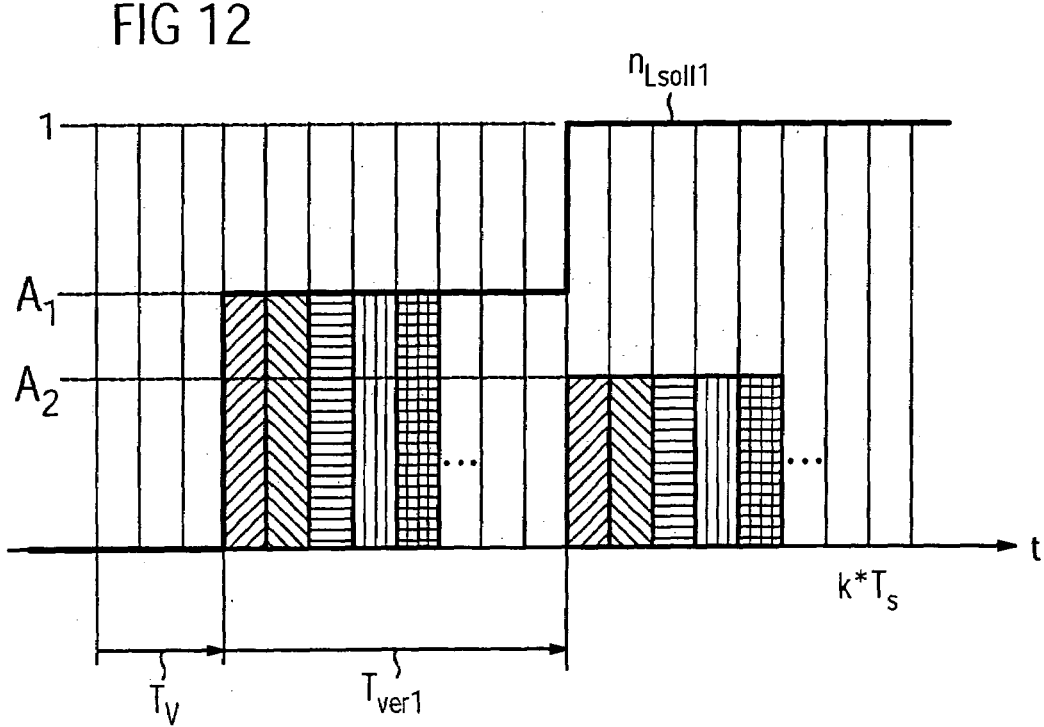
FIG. 12 shows a time delay of an actual position value according to the invention.

FIG. 12 shows the time-delayed desired load rotation speed values $n_{Lsoll1}$ according to the invention which are time-delayed with the delay time $T_v$. Unlike FIG. 6, the desired load rotation speed values $n_{Lsoll1}$ of the drive axle 6a are now time-delayed with the delay time $T_v$ according to equation (8).

Figure 13:
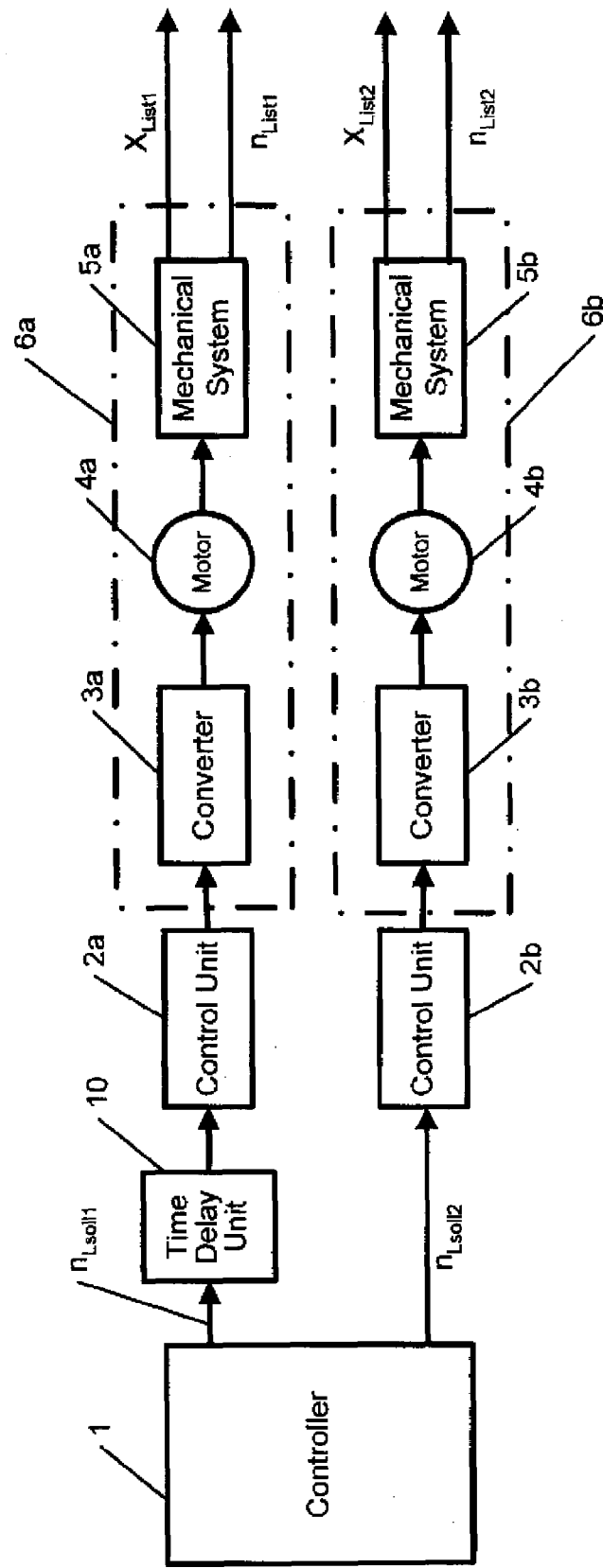
FIG. 13 shows a device according to the invention for controlling the movement of a machine element.

FIG. 13 shows a device according to the invention for controlling the movement of a movable element of a machine tool or production machine, which unlike the embodiment depicted in FIG. 1, includes an additional time delay unit 10. In all other aspects, the components of the device of FIG. 13 and their operation are identical to those of the device of FIG. 1 and will therefore not be described again. According to the invention, the desired load rotation values $n_{Lsoll1}$ of the drive axle 6a are delayed by the delay unit 10 by the delay time $T_v$ before being transmitted to the control unit 2a as a desired controlled variable.

Figure 14:
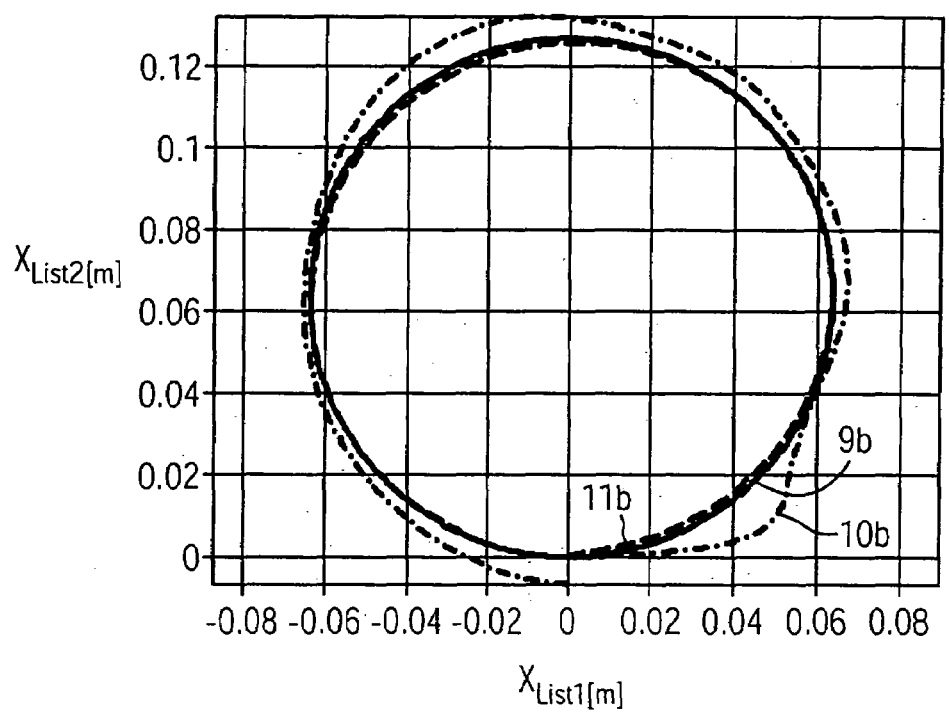
FIG. 14 shows an exemplary circular movement path obtained with the method of the invention.
Figure 15:
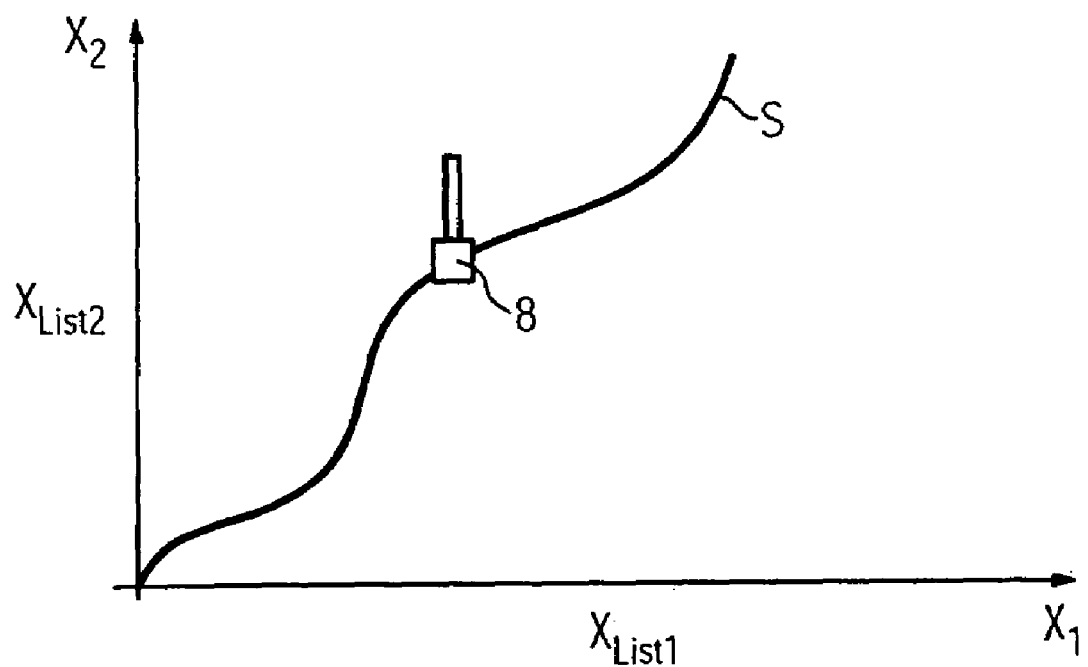
FIG. 15 shows the movement path of a machine element.

FIG. 14 illustrates the improvement in the movement paths achieved with the invention over the circular movement paths described before with reference to FIG. 7. Curve 9b represents an ideal circular path, curve 10b represents the circular path in a conventional operation without "Input Shaping", whereas curve 11b illustrates the circular path attained when both "Input Shaping" and the method of the invention are employed. As seen in FIG. 14, the circular path 11b is almost identical to the ideal circular path 9b. In particular, a significant improvement is obtained over the circular path 11a, which included "Input Shaping", but did not employ the method of the invention.

In the exemplary embodiment, the invention was described with reference to a two-axle machine. However, the invention can also be applied to a machine with three or more drive axles. In this way, a high-quality three-dimensional movement of machine elements can be implemented by using the method and the device of the invention.

The mechanical characteristic frequency of the damped oscillation of the individual drive axles v can be determined by conventional measurement procedures, such as a frequency-dependent excitation of the drive axle and measurement of the resulting oscillations, so that the desired load rotation speed values of the individual drive axles v that do not have the lowest mechanical characteristic frequency $f_{dv}$ can be time-delayed by using a delay unit associated with each drive axle.

In the illustrated embodiments, desired speed values are transmitted from the controller 1 to the control units 2a and 2b that control the movement of the machine element. It will be understood, however, that the desired values can also be provided between the controller 1 and the various other control units for the drive axles as desired position values, desired acceleration values or desired jerk values. The desired position values, acceleration values or jerk values can also be delayed with the method and device according to the invention.

It should also be noted that the delay unit 10 can be an integral component of a controller 12 or of a closed-loop controller 13 and can be easily integrated, for example, in already existing numerical controls without the need for additional hardware.

Moreover, drive axles can have several characteristic frequencies, and the method of the invention can be separately applied to each of these characteristic frequencies or to a combination or superposition of these characteristic frequencies.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A method for controlling a movement of a movable machine element of a machine tool or production machine with separately driven plural drive axles of which one drive axle has a lowest mechanical resonance frequency, comprising the steps of:

driving each drive axle of the machine by supplying desired values to a control unit associated with the drive axle, wherein the desired values for each drive axle are obtained by combining two pulse sequences having a time-offset; and time-delaying the desired values of any of the drive axles having a mechanical resonance frequency higher than the lowest mechanical resonance frequency of the one drive axle with respect to the drive axle having the lowest mechanical resonance frequency.

2. The method of claim 1, wherein the time-delayed desired values of the drive axles having a mechanical resonance frequency higher than the lowest mechanical resonance frequency of the one drive axle are delayed by a delay time $$T_v = \text{abs} \frac{1}{2} * \left( \frac{1}{2f_{dv}} - \frac{1}{2f_d} \right),$$

wherein $f_{dv}$ is the mechanical resonance frequency of a drive axle v with a mechanical resonance frequency higher than the lowest mechanical resonance frequency and $f_d$ is the mechanical resonance frequency of the drive axle with the lowest mechanical resonance frequency.

3. The method of claim 1, wherein the desired values are provided as desired velocity values, desired position values, desired acceleration values or desired jerk values.

4. A device for controlling a movement of a movable machine element of a machine tool or production machine with plural separately driven drive axles of which one drive axle has a lowest mechanical resonance frequency, comprising;
- a control unit associated with each drive axle in one-to-one correspondence for controlling the movement of the corresponding drive axle;
- a machine controller generating for each drive axle of the machine corresponding desired values, wherein the desired values for each drive axle are obtained by combining two pulse sequences having a time-offset, and supplying the generated desired values to the corresponding control unit associated with each drive axle as desired controlled variable to drive the corresponding drive axle; and
- a time delay unit that time-delays the desired values of any of the drive axles having a mechanical resonance frequency that is higher than the lowest mechanical resonance frequency of the one drive axle with respect to the drive axle having the lowest mechanical resonance frequency.

5. The device of claim 4, wherein the time-delayed desired values having a mechanical resonance frequency higher than the lowest mechanical resonance frequency of the one drive axle are delayed by a delay time $$T_v = \text{abs} \frac{1}{2} * \left( \frac{1}{2f_{dv}} - \frac{1}{2f_d} \right),$$

wherein $f_{dv}$ is the mechanical resonance frequency of a drive axle v with a mechanical characteristic frequency higher than the lowest mechanical resonance frequency and $f_d$ is the mechanical resonance frequency of the drive axle with the lowest mechanical resonance frequency.

6. The device of claim 4, wherein the desired values comprise desired velocity values, desired position values, desired acceleration values or desired jerk values.

7. The device of claim 4, wherein the delay unit is an integral part of the machine controller.

8. The device of claim 4, wherein the delay unit is an integral part of a closed-loop controller.

9. The method of claim 1, wherein the desired values of a drive axle having a mechanical resonance frequency higher than the lowest mechanical resonance frequency of the one drive axle is time-delayed with respect to the drive axle having the lowest mechanical resonance frequency by a delay time selected so that an integrated position value of the drive axle having the higher mechanical resonance frequency is identical to an integrated position value of the drive axle having the lowest mechanical resonance frequency.

10. The device of claim 4, wherein the desired values of a drive axle having a mechanical resonance frequency higher than the lowest mechanical resonance frequency of the one drive axle is time-delayed with respect to the drive axle having the lowest mechanical resonance frequency by a delay time selected so that an integrated position value of the drive axle having the higher mechanical resonance frequency is identical to an integrated position value of the drive axle having the lowest mechanical resonance frequency.

11. The method of claim 1, wherein the desired values supplied to each of the drive axles are obtained in the control unit by input-shaping separately for each drive axle, thereby suppressing oscillations independently for each drive axle.

12. The device of claim 1, wherein the desired values supplied to each of the drive axles are obtained in the control unit by input-shaping separately for each drive axle, thereby suppressing oscillations independently for each drive axle.

13. The method of claim 1, further comprising determining the mechanical resonance frequency independently for each individual drive axle by a spectral excitation of the individual drive axle.

* * * * *